United States Patent
Kasahara

(10) Patent No.: US 9,706,177 B2
(45) Date of Patent: Jul. 11, 2017

(54) IMAGE PROCESSING SYSTEM, VEHICLE INCLUDING THE SAME, IMAGE PROCESSING METHOD, AND COMPUTER PROGRAM PRODUCT

(71) Applicant: Ryosuke Kasahara, Kanagawa (JP)

(72) Inventor: Ryosuke Kasahara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 241 days.

(21) Appl. No.: 14/359,750

(22) PCT Filed: Nov. 27, 2012

(86) PCT No.: PCT/JP2012/081228
§ 371 (c)(1),
(2) Date: May 21, 2014

(87) PCT Pub. No.: WO2013/081162
PCT Pub. Date: Jun. 6, 2013

(65) Prior Publication Data
US 2014/0300744 A1    Oct. 9, 2014

(30) Foreign Application Priority Data

Nov. 29, 2011    (JP) .................................. 2011-260298

(51) Int. Cl.
*H04N 9/47*    (2006.01)
*H04N 7/18*    (2006.01)
(Continued)

(52) U.S. Cl.
CPC ............ *H04N 7/183* (2013.01); *B60S 1/0844* (2013.01); *G06K 9/00791* (2013.01);
(Continued)

(58) Field of Classification Search
CPC ...... H04N 7/183; H04N 5/2171; H04N 5/238; H04N 5/232; G06K 9/00791; B60S 1/0844
(Continued)

(56) References Cited

U.S. PATENT DOCUMENTS

2003/0011693 A1    1/2003    Oda
2003/0066948 A1    4/2003    Ockerse et al.
(Continued)

FOREIGN PATENT DOCUMENTS

CN        101873443 A        10/2010
DE    10 2009 000 003 A1    7/2010
(Continued)

OTHER PUBLICATIONS

Extended European Search Report issued on Dec. 3, 2014 in Patent Application No. 12854204.0.
(Continued)

*Primary Examiner* — Jared Walker
(74) *Attorney, Agent, or Firm* — Oblon, McClelland, Maier & Neustadt, L.L.P.

(57) ABSTRACT

According to an embodiment, provided is an image processing system that includes: a light source that emits light; an imaging unit including an imaging element that captures light emitted and reflected from a foreign matter attached to the other surface of the transparent member and that captures light transmitted through the transparent member from the other surface side; and an image analyzing unit that analyzes captured image data. The captured image data is formed of a first image area frame used for detecting a foreign matter, and is formed of a second image area frame that corresponds to an effective imaging area excluding a
(Continued)

predetermined area. Different rules are applied to read pixel data of between the first image area frame and the second image area frame.

15 Claims, 9 Drawing Sheets

(51) Int. Cl.
    *H04N 5/232*     (2006.01)
    *H04N 5/238*     (2006.01)
    *B60S 1/08*     (2006.01)
    *H04N 5/217*     (2011.01)
    *G06K 9/00*     (2006.01)

(52) U.S. Cl.
    CPC ........... *H04N 5/2171* (2013.01); *H04N 5/232* (2013.01); *H04N 5/238* (2013.01)

(58) Field of Classification Search
    USPC ........................................................ 348/148
    See application file for complete search history.

(56) References Cited

U.S. PATENT DOCUMENTS

| | | | |
|---|---|---|---|
| 2003/0201380 A1 | 10/2003 | Ockerse et al. | |
| 2004/0141057 A1* | 7/2004 | Pallaro | B60Q 1/1423 |
| | | | 348/148 |
| 2005/0035926 A1 | 2/2005 | Takenaga et al. | |
| 2006/0243894 A1 | 11/2006 | Takenaga et al. | |
| 2007/0002149 A1 | 1/2007 | Oda | |
| 2007/0023613 A1* | 2/2007 | Schofield | B60Q 1/1423 |
| | | | 250/208.1 |
| 2009/0268061 A1* | 10/2009 | Kawahara | H04N 5/232 |
| | | | 348/240.1 |
| 2010/0231738 A1* | 9/2010 | Border | H04N 5/2353 |
| | | | 348/222.1 |
| 2010/0315536 A1* | 12/2010 | Wang | G06K 7/14 |
| | | | 348/239 |
| 2011/0216198 A1* | 9/2011 | Schofield | G06K 9/00818 |
| | | | 348/148 |
| 2012/0026318 A1 | 2/2012 | Huelsen et al. | |
| 2014/0321709 A1 | 10/2014 | Kasahara et al. | |

FOREIGN PATENT DOCUMENTS

| | | |
|---|---|---|
| EP | 1 507 138 A2 | 2/2005 |
| JP | 2001-189926 | 7/2001 |
| JP | 2003-032694 | 1/2003 |
| JP | 2004-289787 | 10/2004 |
| JP | 2005-195569 | 7/2005 |
| JP | 2007-037176 | 2/2007 |
| JP | 2009-004947 | 1/2009 |
| JP | 4326999 | 6/2009 |
| JP | 2010-204059 | 9/2010 |
| JP | 2010-210607 | 9/2010 |
| JP | 2013-117520 A | 6/2013 |
| WO | WO 03/029056 A2 | 4/2003 |

OTHER PUBLICATIONS

International Search Report Issued Feb. 12, 2013 in PCT/JP2012/081228 Filed on Nov. 27, 2012.
Chinese Office Action issued Mar. 6, 2017 in Patent Application No. 201280058466.6 (with English translation).

* cited by examiner

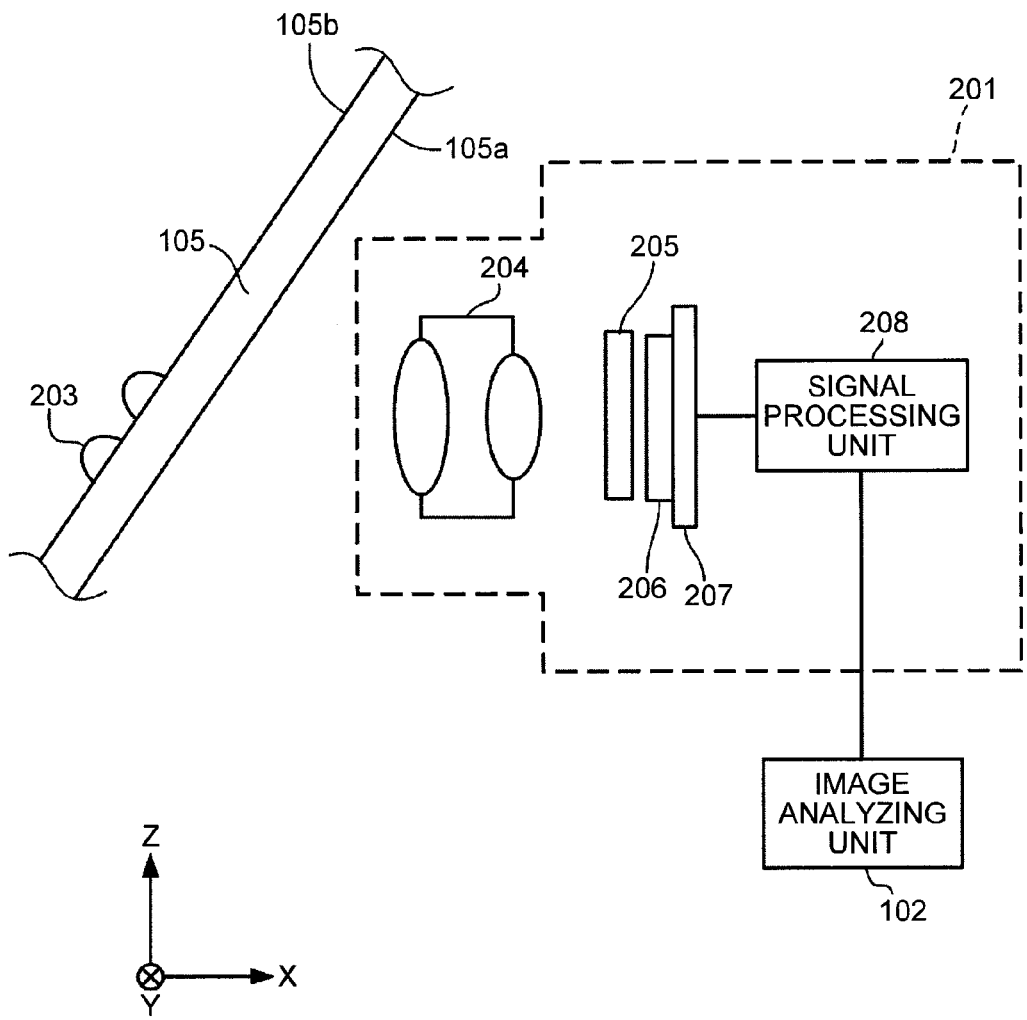
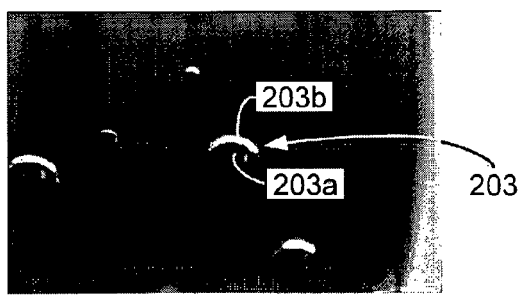 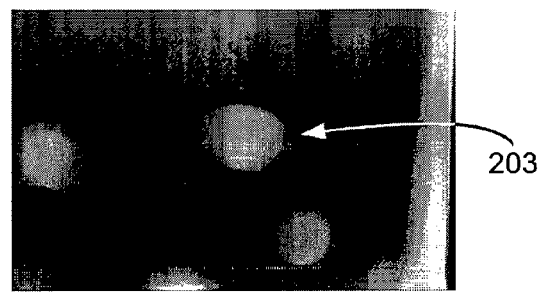

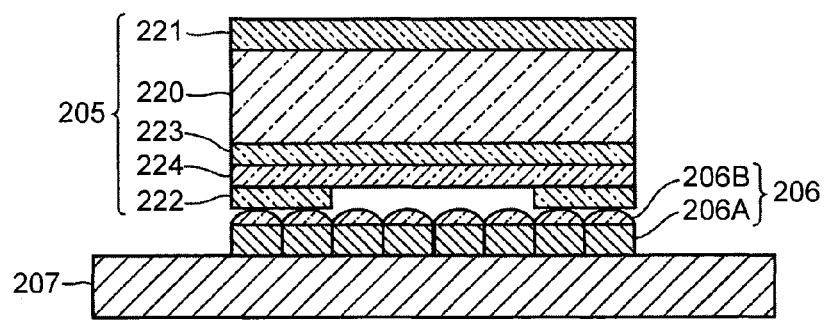
FIG.5
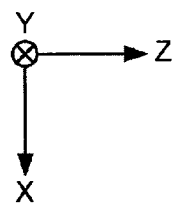
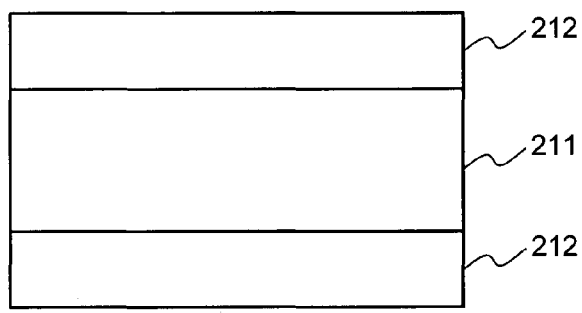
FIG.6
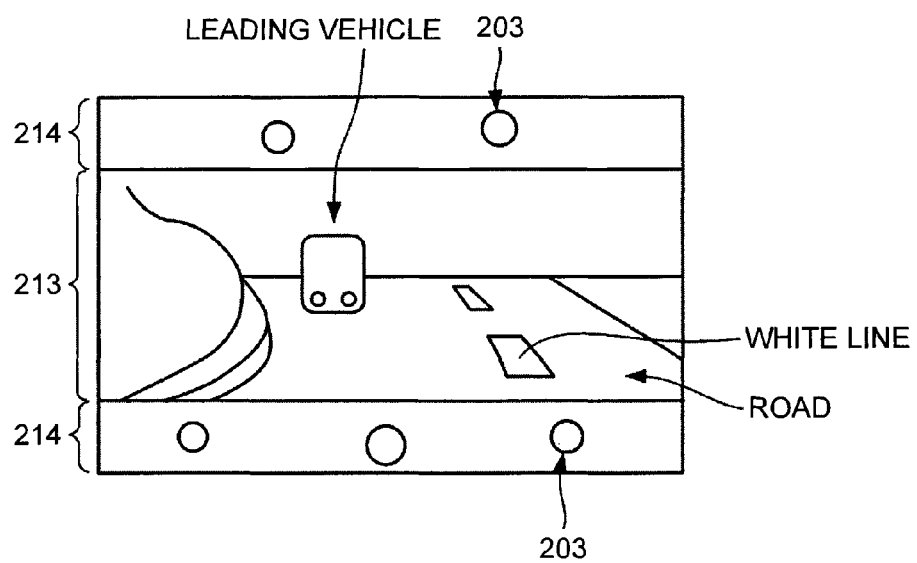
FIG.7

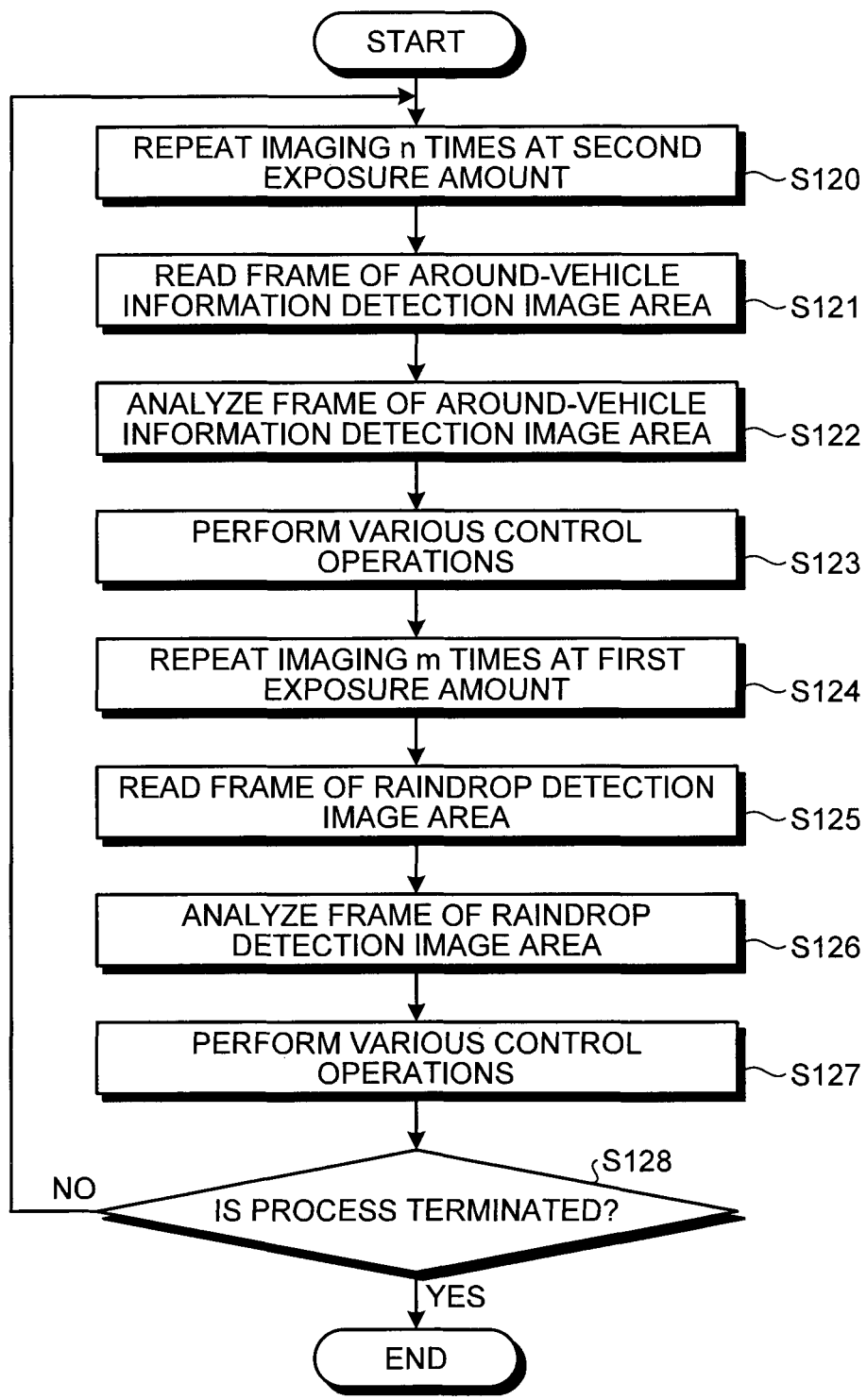

IMAGE PROCESSING SYSTEM, VEHICLE INCLUDING THE SAME, IMAGE PROCESSING METHOD, AND COMPUTER PROGRAM PRODUCT

TECHNICAL FIELD

The present invention relates to an image processing system for optically detecting a foreign matter attached to a surface of a windshield of a vehicle, and relates to a vehicle including the image processing system, an image processing method, and a computer program product.

BACKGROUND ART

In recent years, vehicles such as cars, are provided with an image processing system that functions both as a sensing camera for acquiring information on around the vehicle and as a raindrop detection camera for detecting a raindrop attached to a windshield of the vehicle (for example, see Patent Literature 1: Japanese Patent No. 4326999). Such an image processing system is used in, for example, a system for automatically removing raindrops attached to a windshield of a vehicle by a windshield wiper.

Patent Literature 1 discloses an image processing system that includes an image processing apparatus, a light source, and an optical filter so as to function both as a sensing camera and a raindrop detection camera, and that captures images of raindrops on the outer surface of the windshield by applying light from the light source. In the image processing system, a bandpass filter for detecting a raindrop is provided in a part of the optical filter. In general, it is difficult to change the exposure amount in only a part of a captured image. Therefore, the light emission intensity of the light source is changed so that, while exposure is adjusted to a portion where the bandpass filter is not provided and where affected by external light, the same exposure value can be obtained in a portion where the bandpass filter is provided.

However, the amount of light incident on the camera from the outside of the vehicle greatly varies between, for example, day, and night or depending on weather. The variation is extremely large, ranging from 0.1 lux to a hundred thousand lux. In the image processing system described above, it is necessary to increase the light emission intensity of the light source in proportion to the external light. Therefore, there are problems in terms of power consumption and in terms of safety affected by intensive light emitted to the outside of the vehicle.

Furthermore, readiness is important in detecting other vehicles or white lines. Therefore, it is important to maintain a high frame rate for frames to be captured for sensing.

The present invention has been made to solve the above problems in the conventional technologies, and it is an object of the present invention to provide an image processing system that can, in a system in which one imaging device detects both a foreign matter and information on around the vehicle, reduce the power consumption, enhance the safety, and prevent a reduction in the frame rate for sensing due to insertion of frames for detecting a foreign matter, and to provide a vehicle including the image processing system, an image processing method, and a computer program product.

DISCLOSURE OF INVENTION

According to an embodiment, provided is an image processing system that includes: a light source that emits light from one surface side of a transparent member to the transparent member; an imaging unit including an imaging element that captures light emitted by the light source and reflected from a foreign matter attached to the other surface of the transparent member and that captures light transmitted through the transparent member from the other surface side; and an image analyzing unit that analyzes captured image data captured by the imaging unit. The captured image data is formed of a first image area frame containing a first image area that is used for detecting a foreign matter and that corresponds to a predetermined area, and is formed of a second image area frame containing a second image area that corresponds to an effective imaging area excluding the predetermined area. The image analyzing unit applies different rules to the imaging unit between for reading pixel data of the first image area frame and for reading the second image area frame.

According to another embodiment, provided is a vehicle that includes: an image processing system; a windshield wiper that removes a foreign matter attached to a windshield of the vehicle; and a windshield wiper control unit that receives a detection result of the foreign matter from an image analyzing unit of the image processing system and generates a control signal for controlling the windshield wiper. The image processing system includes: a light source that emits light from one surface side of the windshield to the windshield; an imaging unit including an imaging element that captures light emitted by the light source and reflected from the foreign matter attached to the other surface of the windshield and that captures light transmitted through the windshield from the other surface side; and the image analyzing unit that analyzes captured image data captured by the imaging unit. The captured image data is formed of a first image area frame containing a first image area that is used for detecting a foreign matter and that corresponds to a predetermined area, and is formed of a second image area frame containing a second image area that corresponds to an effective imaging area excluding the predetermined area, and the image analyzing unit applies different rules to the imaging unit between for reading pixel data of the first image area frame and for reading the second image area frame.

According to still another embodiment, provided is an image processing method implemented by an image processing system that includes: a light source that emits light from one surface side of a transparent member to the transparent member, the image processing method comprising: imaging that includes capturing light emitted by the light source and reflected from a foreign matter attached to the other surface of the transparent member and capturing light transmitted through the transparent member from the other surface side; and image-analyzing that includes analyzing captured image data captured at the imaging. The imaging includes imaging a first image area frame containing a first image area that is used for detecting a foreign matter and that corresponds to a predetermined area, and imaging a second image area frame containing a second image area that corresponds to an effective imaging area other than the predetermined area. The image-analyzing includes applying different rules between for reading pixel data of the first image area frame and for reading the second image area frame.

According to still another embodiment, provided is a computer program product that includes a non-transitory computer usable medium having computer-readable program codes embodied in the medium for an image process-

BRIEF DESCRIPTION OF DRAWINGS

FIG. 3 is a schematic diagram illustrating an overall configuration of an imaging device included in the imaging unit;

FIGS. 4A and B are diagrams for explaining infrared image data as captured image data for raindrop detection;

FIG. 5 is a schematic cross-sectional view of an optical filter, an imaging element, and a sensor board along a light transmission direction;

FIG. 6 is a schematic front view for explaining how an effective imaging area of the optical filter is divided into multiple areas;

FIG. 7 is a diagram for explaining an example of a captured image;

FIG. 10 is a flowchart of the flow of an image processing method according to the embodiment;

FIGS. 12A to D are diagrams for explaining examples of how pixels are thinned out;

BEST MODE (S) FOR CARRYING OUT THE INVENTION

Figure 1:
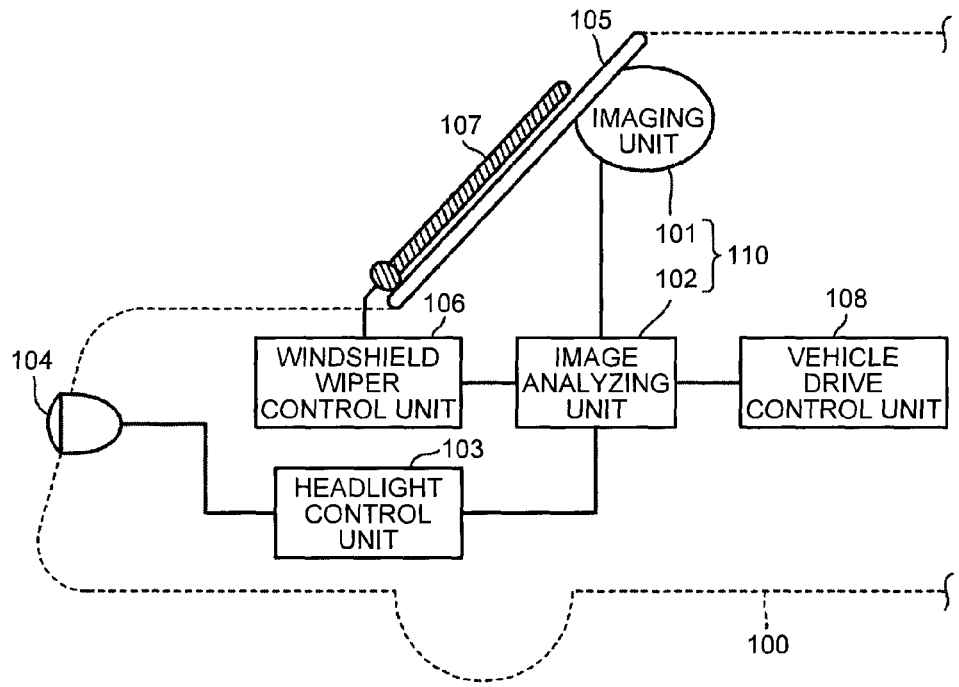
FIG. 1 is a schematic diagram illustrating an overall configuration of an in-vehicle device control system including an image processing system according town embodiment.

Exemplary embodiments of an image processing system, a vehicle including the image processing system, an image processing method, and a computer program product will be explained below with reference to the drawings. The dimensional ratio of the components in the drawings is not necessarily the same as the actual dimensional ratio.

FIG. 1 is a schematic diagram illustrating an overall configuration of an in-vehicle device control system including an image processing system 110 according to the embodiment. The in-vehicle device control system controls light distribution of a headlight 104, controls driving of a windshield wiper 107 for removing a foreign matter attached to a windshield (transparent member) 105, and controls other in-vehicle devices, by using captured image data of a front area in a running direction of a vehicle 100, which is captured by an imaging unit 101 installed in the vehicle 100, such as a car.

The in-vehicle device control system illustrated in FIG. 1 mainly includes the imaging unit 101, an image analyzing unit (image analyzing means) 102, a headlight control unit 103, a windshield wiper control unit 106, and a vehicle drive control unit 108.

The image processing system 110 of the embodiment includes the imaging unit 101 and the image analyzing unit 102. The image analyzing unit 102 has a function to control the imaging unit 101 and a function to analyze captured image data transmitted from the imaging unit 101.

The image analyzing unit 102 analyzes the captured image data transmitted from the imaging unit 101 to detect a foreign matter, such as a raindrop, attached to the windshield 105, to calculate positions, directions, or distances of other vehicles in front of the vehicle 100 in the captured image data, or to detect a detection object, such as a white line (compartment line), on the road within an imaging range. Hereinafter, information on the positions, the directions, and the distances of the other vehicles in front of the vehicle 100 and information on the white line (compartment line) on the road are also described as around-vehicle information. To detect other vehicles, leading vehicles running in the same running direction as the vehicle 100 are detected by discriminating the taillights of the other vehicles, and oncoming vehicles running in the opposite direction of the vehicle 100 are detected by discriminating the headlights of the other vehicles.

The calculation result obtained by the image analyzing unit 102 is sent to the headlight control unit 103. The headlight control unit 103 generates, for example, a control signal for controlling the headlight 104, which is an in-vehicle device of the vehicle 100, based on distance data calculated by the image analyzing unit 102. Specifically, for example, the headlight control unit 103 controls switching between high beam and low beam of the headlight or controls partial blocking of the headlight 104 in order to ensure the field of vision of the driver of the vehicle 100 while preventing intensive light from the headlight of the vehicle 100 from entering the eyes of the drivers of leading vehicles and oncoming vehicles to thereby prevent the drivers of the other vehicles from dazzling.

The calculation result obtained by the image analyzing unit 102 is also sent to the windshield wiper control unit 106. The windshield wiper control unit 106 causes the windshield wiper 107 to remove an extraneous matter, such as a raindrop, attached to the windshield 105 of the vehicle 100. The windshield wiper control unit 106 receives a foreign matter detection result obtained by the image analyzing unit 102 and generates a control signal for controlling the windshield wiper 107. When the control signal generated by the windshield wiper control unit 106 is sent to the windshield wiper 107, the windshield wiper 107 is driven to operate to ensure the field of vision of the driver of the vehicle 100.

The calculation result obtained by the image analyzing unit 102 is also sent to the vehicle drive control unit 108. The vehicle drive control unit 108 issues an alarm to the driver of the vehicle 100 or supports driving by controlling a wheel or a brake of the vehicle when, for example, the vehicle 100 drifts from a lane separated by white lines, based on a white line detection result obtained by the image analyzing unit 102.

Figure 2:
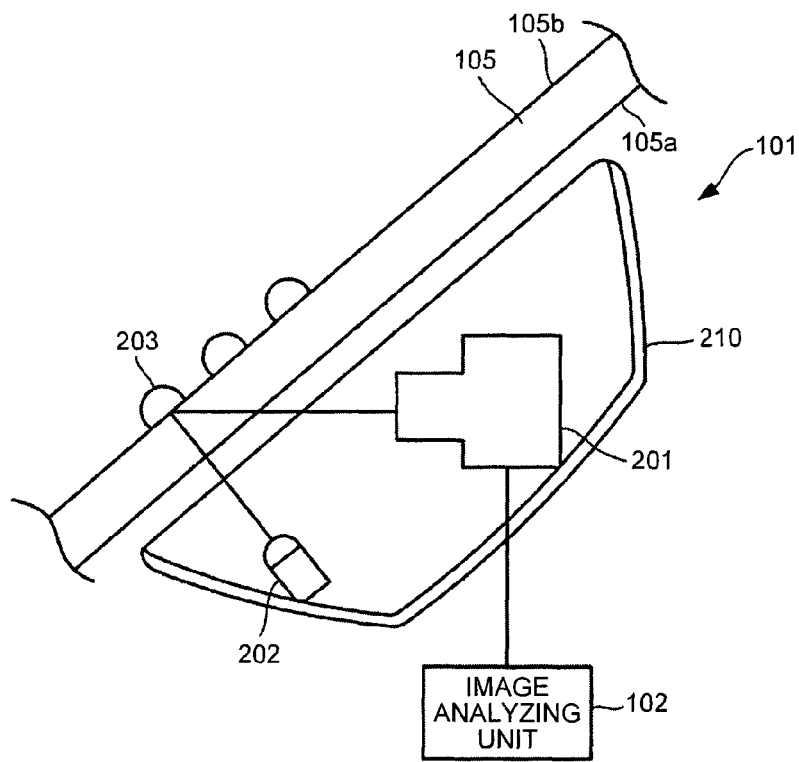
FIG. 2 is a schematic diagram illustrating an overall configuration of an imaging unit included in the image processing system according to the embodiment.

FIG. 2 is a schematic diagram illustrating an overall configuration of the imaging unit 101 included in the image processing system 110 according to the embodiment. As illustrated in FIG. 2, the imaging unit 101 includes a cover 210 fixed to the inside of the vehicle 100, an imaging device 201 (imaging means), and a light source 202 that emits light from an inner surface (one surface) 105a side of the windshield 105 of the vehicle 100 toward the windshield 105. The imaging device 201 and the light source 202 are housed inside the cover 210. FIG. 2 illustrates an example in which one light source 202 is housed in the cover 210. However, the number of the light sources is not limited to one and may be plural.

FIG. 3 is a schematic diagram illustrating an overall configuration of the imaging device 201 included in the imaging unit 101. The imaging device 201 mainly includes an imaging lens 204 that condenses light emitted by the light source 202 (see FIG. 2) and reflected from a foreign matter 203 (hereinafter, an example is explained in which the foreign matter is a raindrop) attached to an outer surface (the other surface) 105b of the windshield 105, and condenses light transmitted through the windshield 105 from the outside of the vehicle 100 (from the outer surface 105b side); an imaging element 206 that captures the light condensed by the imaging lens 204; an optical filter 205 that is provided between the imaging lens 204 and the imaging element 206 and that transmits only light within a predetermined wavelength range in a predetermined area of the effective imaging area; a sensor board 207 on which the imaging element 206 is mounted; and a signal processing unit 208 that generates and outputs captured image data obtained by converting an analog electrical signal (the amount of light received by each light-receiving element on the imaging element 206) output by the sensor board 207 into a digital electrical signal.

The imaging lens 204, the optical filter 205, the imaging element 206, and the sensor board 207 are provided in this order from the windshield 105 side. The signal processing unit 208 is electrically connected to the image analyzing unit 102. FIG. 3 illustrates an example in which the imaging element 206 and the signal processing unit 208 are separate from each other; however, the configuration of the imaging device 201 is not limited to this example. For example, if the imaging element 206 is provided with an analog-to-digital converting unit at each pixel, the analog-to-digital converting unit functions as the signal processing unit 208. Namely, in this case, the signal processing unit 208 is equipped in the imaging element 206.

The imaging element 206 includes a not-illustrated register (sensor register). A rule for reading pixel data to be described below is controlled by changing a parameter value in the sensor register by the image analyzing unit 102.

The light source 202 is provided so that an angle of view range of the imaging lens 204 and an irradiation area of the light source 202 overlap each other on the inner surface 105a of the windshield 105. As the light source 202, a light source with a wavelength and a light intensity in the eye-safe band is used. The imaging lens 204 is formed of, for example, a plurality of lenses, and is focused on infinity or between infinity and the outer surface 105b of the windshield 105.

The light source 202 is used to detect a raindrop attached to the outer surface 105b of the windshield 105. When the raindrop 203 is attached to the outer surface 105b of the windshield 105, light emitted by the light source 202 is reflected from the interface between the raindrop 203 and air, and the reflected light enters the imaging device 201. On the other hand, when the raindrop 203 is not attached to the outer surface 105b of the windshield 105, a part of light emitted by the light source 202 is output to the outside through the windshield 105, while the rest of the light is reflected from the inner surface 105a of the windshield 105 or from the interface between the outer surface 105b and air and the reflected light enters the imaging device 201.

As the light source 202, a light emitting diode (LED) or a semiconductor laser (LD) may be used. The emission wavelength of the light source 202 is preferably, for example, the wavelength in the visible light region or in the infrared region. However, to prevent drivers of oncoming vehicles or pedestrians from dazzling due to the light from the light source 202, it is preferable to select a wavelength longer than the visible light and within a range of the light sensitivity of the imaging element 206, for example, a wavelength in the infrared region between 750 nm and 1000 nm. Hereinafter, an example is explained in which the light source 202 emits light with a wavelength in the infrared region.

The light source 202 may be configured to perform continuous emission (CW emission) or perform pulse emission at a predetermined timing. In particular, a configuration that performs pulse emission is preferable because it can reduce the influence of ambient light by synchronizing a timing of light emission and a timing of capturing an image.

Light from an imaging range containing an object (detection object) passes through the imaging lens 204, transmits the optical filter 205, and is converted into an electrical signal corresponding to the light intensity by the imaging element 206. The object (detection object) may be a scenery in front of the vehicle 100 or a foreign matter such as a raindrop attached to the outer surface 105b of the windshield 105. When receiving the electrical signal (analog signal) output by the imaging element 206, the signal processing unit 208 outputs, as captured image data, a digital signal containing luminance (luminance information) of each of pixels on the imaging element 206 to a unit on the subsequent stage together with horizontal and vertical synchronous signals of an image, based on the electrical signal.

As described above, in the embodiment, the imaging lens 204 is focused on infinity or between infinity and the outer surface 105b of the windshield 105. Therefore, it becomes possible to acquire appropriate information from the captured image data obtained by the imaging device 201 not only for detecting the raindrop 203 attached to the windshield 105 but also for detecting a leading vehicle, an oncoming vehicle, or a white line.

For example, to detect the raindrop 203 attached to the windshield 105, because an image of the raindrop in the captured image data is usually in a circular shape, a shape recognition process is performed in which whether a raindrop candidate image in the captured image data is in a circular shape or not is determined to discriminate whether the raindrop candidate image is a raindrop image. When such a shape recognition process is to be performed, a raindrop detection performance is increased when the imaging lens 204 is focused on infinity or between infinity and the windshield 105 as described above because the recognition rate of the shape (circular shape) of the raindrop can be increased due to occurrence of slight focus blur, compared with a case where the imaging lens 204 is focused on the raindrop 203 on the outer surface 105b of the windshield 105.

FIGS. 4A and B are diagrams for explaining infrared image data as captured image data for raindrop detection. FIG. 4A illustrates the infrared image data obtained when the imaging lens 204 is focused on the raindrop 203 on the outer surface 105b of the windshield 105, and FIG. 4B illustrates the infrared image data obtained when the imaging lens 204 is focused on infinity.

When the imaging lens 204 is focused on the raindrop 203 on the outer surface 105b of the windshield 105, as illustrated in FIG. 4A, a background image 203a appearing in the raindrop is also captured. The background image 203a as described above causes false detection of the raindrop 203. Besides, in some cases, the luminance of a portion 203b of the raindrop increases in an arcuate shape as illustrated in FIG. 4A, and the shape of the portion with the increased luminance, that is, the shape of a raindrop image, changes depending on the direction of sunlight or the position of a street lamp. To perform the shape recognition process to cope with the shape of the raindrop image that changes in various ways, processing load increases and recognition accuracy is reduced.

By contrast, when the imaging lens is focused on infinity, as illustrated in FIG. 4B, slight focus blur occurs. Therefore, the background image 203a appearing in the raindrop is not reflected in the captured image data, so that false detection of the raindrop 203 can be reduced. Furthermore, due to the slight focus blur, the degree of change in the shape of the raindrop image based on the direction of sunlight or the position of a street lamp can be reduced, so that the shape of the raindrop image becomes always an approximate circle. Therefore, load due to the shape recognition process on the raindrop 203 can be reduced and the recognition accuracy can be increased.

However, when the taillight of a leading vehicle running far is to be discriminated while the imaging lens is focused on infinity, in some cases, only one or two light-receiving elements on the imaging element 206 become available to receive light of the taillight. In this case, the light of the taillight may not be received by a light-receiving element for red that receives the color (red) of the taillight. In this case, it becomes difficult to discriminate the taillight and detect the leading vehicle. To prevent such a defect, the imaging lens 204 is preferably focused on a point closer than infinity. Consequently, the taillight of the leading vehicle running far becomes out of focus and the number of light-receiving elements that receive light of the taillight can be increased. Therefore, it is possible to increase the recognition accuracy of the taillight, enabling to increase the detection accuracy of the leading vehicle.

When the imaging device 201 captures infrared-wavelength light that is emitted by the light source 202 and reflected from the windshield 105, the imaging element 206 of the imaging device 201 receives not only the infrared-wavelength light from the light source 202 but also, for example, a large amount of ambient light, such as sunlight, including infrared-wavelength light. Therefore, to discriminate the infrared-wavelength light emitted by the light source 202 from the large amount of ambient light as described above, the light source 202 needs to emit a greater amount of light than the ambient light. However, it is often extremely difficult to use the light source 202 that can emit such a large amount of light.

Therefore, in the embodiment, for example, it is configured that the imaging element 206 receives light from the light source 202 via a cut filter that cuts off light with a wavelength shorter than the emission wavelength of the light source 202 or via a bandpass filter whose peak transmittance is approximately the same as the emission wavelength of the light source 202. Consequently, it becomes possible to eliminate light with wavelengths other than the emission wavelength of the light source 202 when receiving light, so that the amount of light received by the imaging element 206 from the light source 202 becomes relatively greater than the ambient light. As a result, it becomes possible to discriminate the light emitted by the light source from the ambient light without using a light source that emits a large amount of light.

However, in the embodiment, not only a foreign matter, such as the raindrop 203, on the windshield 105 but also a leading vehicle, an oncoming vehicle, or a white line are detected from the captured image data. Therefore, if a wavelength band other than the infrared-wavelength light emitted by the light source 202 is eliminated from the whole captured image, the imaging element 206 cannot receive light in a wavelength band needed to detect a leading vehicle, an oncoming vehicle, or a white line, so that the detection may be negatively affected. Therefore, in the embodiment, an image area of the captured image data is divided into a raindrop detection image area (first image area) for detecting the raindrop 203 on the windshield 105 and an around-vehicle information detection image area (second image area) for detecting a leading vehicle, an oncoming vehicle, or a white line, and the wavelength band other than the infrared-wavelength light emitted by the light source 202 is eliminated only from a portion corresponding to the raindrop detection image area.

FIG. 5 is a schematic cross-sectional view of the optical filter 205, the imaging element 206, and the sensor board 207 along a light transmission direction.

The optical filter 205 includes, as illustrated in FIG. 5, a substrate 220 that is transparent with respect to light in a bandwidth to be used (in the embodiment, a visible light region and an infrared region); a spectral filter layer (first spectral filter layer) 221 that is formed on the entire surface of the effective imaging area of the substrate 220 on the imaging lens 204 side and that transmits only light of a wavelength component in ranges from wavelengths $\lambda 1$ to $\lambda 2$ and wavelengths $\lambda 3$ to $\lambda 4$ ($\lambda 1<\lambda 2<\lambda 3<\lambda 4$); a polarization filter layer 223 formed on the surface of the substrate 220 on the imaging element 206 side; a filler 224 provided on the polarization filter layer 223; and a spectral filter layer (second spectral filter layer) 222 that is formed in a part of the effective imaging area of the substrate 220 on the imaging element 206 side via the polarization filter layer 223 and the filler 224 and that transmits only light of a wavelength component in a range of the wavelengths $\lambda 3$ to $\lambda 4$. The surface of the spectral filter layer 222 on the imaging element 206 side is closely joined to the imaging element 206.

Namely, the optical filter 205 has a structure in which the spectral filter layer 221 and the spectral filter layer 222 are overlaid with each other in the light transmission direction.

FIG. 6 is a schematic front view for explaining how to divide an effective imaging area of the optical filter 205 having the spectral filter layer 221 and the spectral filter layer 222. As illustrated in FIG. 6, the effective imaging area is divided into a visible light transmission area 211 corresponding to the around-vehicle information detection image area described, above and infrared light transmission areas 212 corresponding to the raindrop detection image area described above.

For example, it is preferable that the visible light transmission area 211 be a half center area in the effective imaging area, and the infrared light transmission areas 212 be upper and lower areas in the effective imaging area. Alternatively, the infrared light transmission areas 212 may be provided in an upper, lower, or side part of the effective imaging area. However, it is particularly preferable to provide the infrared light transmission area 212 in the upper and the lower parts of the effective imaging area as illustrated in FIG. 6. The reason for this is explained below. FIG. 7 illustrates an example of the captured image data.

An image of the headlight of an oncoming vehicle (not illustrated), an image of the taillight of a leading vehicle, and an image of a white line are likely to appear mainly in the center of a captured image, and an image of a road near and in front of the vehicle generally appears in the lower part of the captured image. Therefore, information needed to discriminate the headlight of the oncoming vehicle (not illustrated), the taillight of the leading vehicle, and the white line is concentrated in the center of the captured image, and information in the lower part of the captured image is less important for the discrimination. Meanwhile, the upper part of the captured image generally contains sky, and therefore, information in the upper part of the captured image is also less important.

Therefore, to simultaneously detect an oncoming vehicle, a leading vehicle, or a white line and the raindrop 203 from one captured image data, as illustrated in FIG. 7, it is preferable to set an around-vehicle information detection image area 213 in the center part of the captured image and set a raindrop detection image areas 214 in the upper and lower parts of the captured image. That is, as illustrated in FIG. 6, it is preferable to set the infrared light transmission areas 212 for raindrop detection in the upper and lower parts of the effective imaging area, set the visible light transmission area 211 for around-vehicle information detection in the remaining center part of the effective imaging area, and divide the spectral filter layer 222 in accordance with the set areas.

It may be possible to form a filter for cutting the infrared-wavelength light emitted by the light source 202 in an area of the filler 224 where the spectral filter layer 222 is not formed in the effective imaging area.

The imaging element 206 is an image sensor using a charge coupled device (CCD) or a complementary metal oxide semiconductor (CMOS), and includes photodiodes 206A as light-receiving elements. The photodiodes 206A are arranged in a two-dimensional array based on pixels. To increase the light focusing efficiency of the photodiodes 206A, micro lenses 206B are provided on the incident side of the photodiodes 206A in accordance with the pixels of the photodiodes 206A, respectively. The imaging element 206 is bonded to a printed wiring board (PWB) by a wire bonding or the like to form the sensor board 207.

Figure 8A:
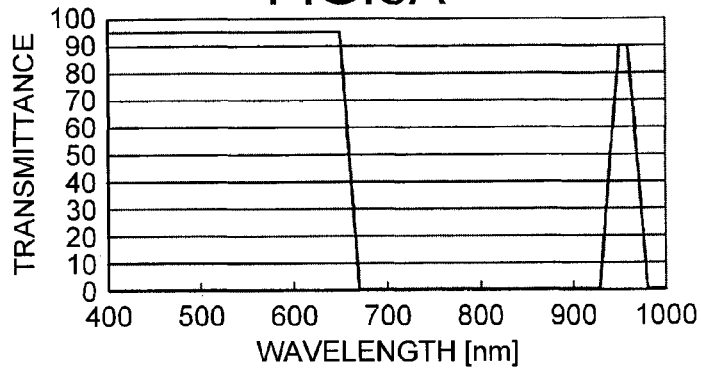
FIGS. 8A and B illustrate graphs showing spectral characteristics of first and second spectral filter layers.

FIGS. 8A and B illustrate graphs showing the spectral characteristics of the spectral filter layer 221 and the spectral filter layer 222. The spectral filter layer 221 transmits, as illustrated in FIG. 8A, light in what is called a visible light region with the wavelength range of 400 nm to 670 nm (here, $\lambda 1=400$ nm and $\lambda 2=670$ nm) and light in an infrared region with the wavelength range of 940 nm to 970 nm (here, $\lambda 3=940$ nm and $\lambda 4=970$ nm). The light in the visible light region is used for detecting around-vehicle information and the light in the infrared region is used for detecting a raindrop.

However, each of the photodiodes 206A included in the imaging element 206 of the embodiment is sensitive to the light in the infrared wavelength band. Therefore, when the imaging element 206 receives light including the infrared wavelength band, a captured image becomes entirely reddish. Consequently, in some cases, it becomes difficult to discriminate a red image portion corresponding to the taillight. Therefore, in the embodiment, the spectral filter layer 221 prevents infrared light with the wavelength range of 670 nm to 940 nm from being transmitted (the transmittance of 5% or smaller is desirable). Consequently, the infrared wavelength band is eliminated from a captured image data part used for discriminating the taillight, so that the discrimination accuracy of the taillight can be improved.

Figure 8B:
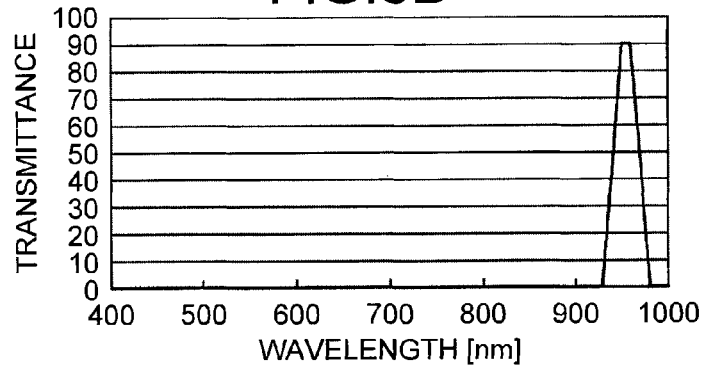

Besides, the transmission band of the spectral filter layer 222 is set to the infrared region with the wavelength range of 940 nm to 970 nm as illustrated in FIG. 8B. Therefore, the optical filter 205 transmits only light in the wavelength range of 940 nm ($=\lambda 3$) to 970 nm ($=\lambda 4$) because of a combination of the spectral filter layer 222 and the spectral filter layer 221 as described above. It is desirable that the peak transmittance in the wavelength range from $\lambda 3$ to $\lambda 4$ is approximately the same as the emission wavelength of the light source 202 (or the emission wavelength is within the wavelength range of $\lambda 3$ to $\lambda 4$).

Figure 9A:
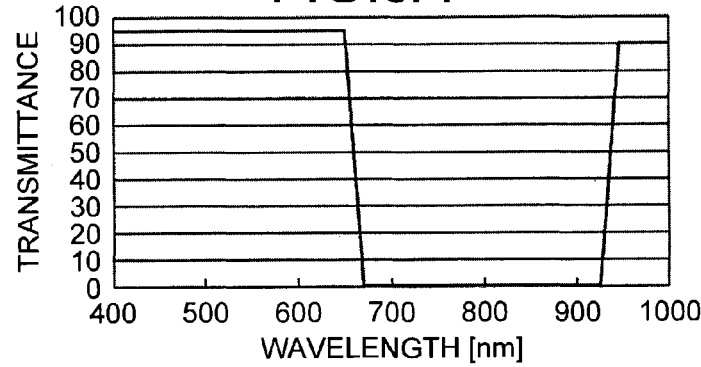
FIGS. 9A and B illustrate graphs showing another example of the spectral characteristics of the first and second spectral filter layers.
Figure 9B:
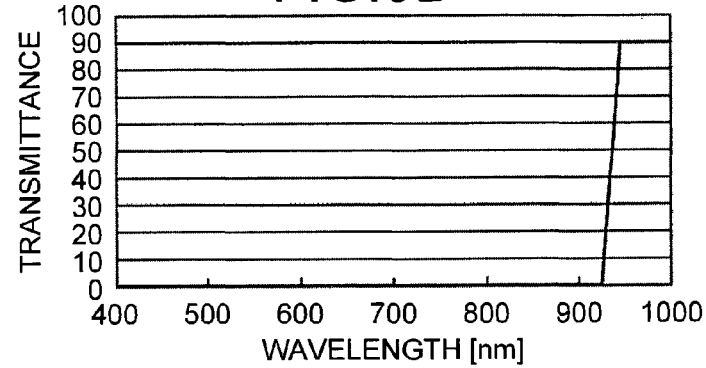

The spectral filter layer 221 may have the spectral characteristics illustrated in FIG. 9A instead of the spectral characteristics illustrated in FIG. 8A. The spectral filter layer 222 may have the spectral characteristics illustrated in FIG. 9B instead of the spectral characteristics illustrated in FIG. 8B (the characteristics including a bandpass filter with the peak transmittance of approximately the same as the emission wavelength of the light source 202). That is, the spectral characteristics of the spectral filter layer 222 may include the characteristics of cutting light on the shorter wavelength side than the emission wavelength of the light source 202.

Meanwhile, when the imaging direction of the imaging device 201 is shifted downward, a hood of the vehicle may appear in the lower part of an imaging range. In this case, sunlight reflected from the hood of the vehicle, the taillight of a leading vehicle, or the like becomes ambient light, and the ambient light contained in the captured image data causes false discrimination of the headlight of an oncoming vehicle, the taillight of an incoming vehicle, and a white line. Even in this case, in the embodiment, because the spectral filter layer 221 for blocking light in the wavelength range of 670 nm to 940 nm is formed in the whole effective imaging area, the ambient light, such as the sunlight reflected from the hood or the taillight of the leading vehicle, can be eliminated. Therefore, the discrimination accuracy of the headlight of the oncoming vehicle, the taillight of the leading vehicle, and the white line can be improved.

By forming the spectral filter layer 221 and the spectral filter layer 222 on both sides of the substrate 220 of the optical filter 205, it becomes possible to prevent warpage of the optical filter 205. For example, if the spectral filter layer is formed on only one side of the substrate 220, stress is applied to the substrate 220 resulting in warpage. However, as illustrated in FIG. 5, if the spectral filter layers are formed on both sides of the substrate 220, the effect of the stress can be cancelled out and the warpage can be prevented.

As illustrated in FIG. 5 and FIG. 6, it is desirable to employ a pattern, in which the spectral filter layers 222 are provided in the upper and lower parts of the effective imaging area. If the infrared light transmission area 212 for raindrop detection is provided in only one of the upper and lower parts of the effective imaging area, it becomes difficult to bond the optical filter 205 and the imaging element 206 parallel to each other. If the optical filter 205 and the imaging element 206 are bonded at a tilt, the light path length varies between the upper part and the lower part of the effective imaging area. As a result, recognition accuracy may be reduced due to a false reading of around-vehicle information, such as a false reading of a coordinate of a white line when the white line is to be detected.

Even when a pattern, in which pixels used for raindrop detection and pixels used for around-vehicle information detection are arranged in a checker manner or in a strip manner, is formed in the whole effective imaging area, the optical filter 205 and the imaging element 206 can be bonded parallel to each other. In this case, it becomes possible to ensure the greater infrared light transmission area 212, enabling to improve the detection accuracy of a raindrop.

The polarization filter layer 223 is formed to cut ambient light that is reflected from the inner surface 105a of the windshield 105 after light is emitted from the light source 202. In general, it is known that the majority of polarization components of such ambient light are an S-polarized component. That is, the polarizing axis of the polarization filter layer 223 is formed so as to block the light of a component (S-polarized component) in the polarization direction orthogonal to the normal line of the inner surface 105a of the windshield 105. In other words, the polarization filter layer 223 is designed so as to transmit only a polarization component (P-polarized component) parallel to a plane formed by two optical axes, that is an optical axis 22 of light emitted from the light source 202 toward the windshield 105 and an optical axis 23 of the imaging lens 204. The polarization filter layer 223 designed as above can also block additional light reflected from a dashboard or the like.

As described above, the optical filter 205 is closely provided on the surface of the imaging element 206 on the micro lenses 206B side. It may be possible to provide a space between the optical filter 205 and the imaging element 206. However, with the configuration in which the optical filter 205 is closely adhered to the imaging element 206, it becomes possible to easily match the boundary between the visible light transmission area 211 and the infrared light transmission areas 212 in the optical filter 205 with the boundary between the photodiodes 206A in the imaging element 206. Consequently, the boundary between the infrared light transmission areas 212 and the visible light transmission area 211 becomes distinct, so that the detection accuracy of a raindrop can be improved.

The optical filter 205 and the imaging element 206 may be bonded by, for example, a UV adhesive. Alternatively, the optical filter 205 and the imaging element 206 may be bonded by UV bonding or thermocompression bonding at four side areas outside of the effective pixel range while they are supported by a spacer outside the effective pixel range used by imaging.

Furthermore, as in the embodiment, when multiple light sources are used, it may be possible to cause the light sources to simultaneously emit light or to sequentially emit light. When the light is emitted sequentially, and if the timing of light emission and the timing of imaging are synchronized with each other, the influence of the ambient light can be reduced.

Meanwhile, FIG. 7 illustrates an image obtained by simultaneously imaging the around-vehicle information and the raindrop. However, the around-vehicle information and the raindrop may be imaged separately. For example, the imaging device 201 may capture an image at a first exposure amount (exposure time) for imaging a foreign matter, such as a raindrop, attached to the outer surface 105b of the windshield 105 in the infrared light transmission areas 212, and captures an image at a second exposure amount (exposure time) for imaging a distant view far from the position of the outer surface 105b of the windshield 105 in the visible light transmission area 211.

The amount of light needed to capture an image differs between the visible light transmission area 211 and the infrared light transmission areas 212. However, in the above configuration in which two image are captured at different exposure time, it becomes possible to capture each image at the optimal exposure.

Specifically, to capture an image of a distant view, the image analyzing unit 102 automatically adjusts exposure while detecting the amount of light that transmits the effective imaging area (the visible light transmission area 211) in which only the spectral filter layer 221 is formed. To capture an image of a raindrop, the image analyzing unit 102 automatically adjusts exposure while detecting the amount of light transmitting the effective imaging area (the infrared light transmission areas 212) in which the spectral filter layer 221 and the spectral filter layer 222 are formed.

In the effective imaging area in which only the spectral filter layer 221 is formed, the amount of light greatly varies. Specifically, the irradiance near the vehicle varies between several tens of thousands lux during daytime and one lux or lower during nighttime. Therefore, it is necessary to adjust the exposure time depending on a scene to be imaged. To cope with this, it is satisfactory to perform known automatic exposure control. In the imaging device 201 explained in the embodiment, because an object is near the road, it is desirable to control exposure based on an image of the road area.

On the other hand, in the effective imaging area in which the spectral filter layer 221 and the spectral filter layer 222 are formed, because the area is designed so as to acquire only reflected light from a foreign matter, such as a raindrop, the amount of light does not greatly vary due to a peripheral environment. Therefore, it may be possible to capture an image at a fixed exposure time.

As described above, the around-vehicle information detection image area is used by the image analyzing unit 102 to perform, for example, a process for discriminating a white line or a vehicle. In the recognition process, information between input image frames is also used. Therefore, it is necessary to input captured frames to the image analyzing unit 102 at predetermined time intervals or under a predetermined rule.

Meanwhile, a result of the raindrop detection is less likely to change in a short period of time compared with, for example, detection of a drift from a lane or detection of an inter-vehicular distance ahead, and the priority of the raindrop detection is lower in terms of safety. Therefore, it is desirable to insert a frame used for raindrop detection (hereinafter, described as a frame of a raindrop detection image area) into frames used for around-vehicle information detection (hereinafter, described as a frame of an around-vehicle information detection image area) at regular intervals.

FIG. 10 is a flowchart of the flow of an image processing method of the embodiment. The imaging device 201 repeats imaging sequentially n times at the second exposure amount for imaging the frame of the around-vehicle information detection image area (a second image area frame) (Step S120). The image analyzing unit 102 reads pixel data of the frame of the around-vehicle information detection image area imaged by the imaging device 201 (Step S121).

It is desirable to read pixel data not from the whole area of the frame of the around-vehicle information detection image area (that is, the whole effective imaging area) but from only the around-vehicle information detection image area. Consequently, it becomes not necessary to read pixel data of the raindrop detection image area that is not needed for sensing, and it becomes possible to reduce time to read data from the frame of the around-vehicle information detection image area (it becomes possible to reduce the number of clocks for reading). Therefore, it becomes possible to increase the frame rate of the frame of the around-vehicle information detection image area.

The image analyzing unit 102 analyzes the frame of the around-vehicle information detection image area read at Step S121 (Step S122), and outputs an instruction signal for causing the headlight control unit 103, the vehicle drive control unit 108, or the like to perform various control operations (Step S123).

The imaging device 201 repeats imaging sequentially m times at the first exposure amount for imaging the frame of the raindrop detection image area (a first image area frame) (Step S124). The image analyzing unit 102 reads pixel data of the frame of the raindrop detection image area imaged by the imaging device 201 (Step S125).

It is desirable to read the pixel data not from the whole area of the frame of the raindrop detection image area (that is, the whole effective imaging area) but from only the raindrop detection image area. Consequently, it becomes not necessary to read pixel data of the around-vehicle information detection image area that is not needed for detecting a raindrop, so that it becomes possible to reduce time to read the frame of the raindrop detection image area. Therefore, it becomes possible to increase the frame rate of the frame of the around-vehicle information detection image.

The image analyzing unit 102 analyzes the frame of the raindrop detection image area read at Step S125 (Step S126), and outputs an instruction signal for causing the windshield wiper control unit 106 or the like to perform various control operations (Step S127).

Until a predetermined termination instruction (a termination instruction issued by the driver of the vehicle 100, or the like) is issued, the processes from Steps S120 to S127 are repeated (Step S128).

In the above processes, the number m of repetitions of imaging at the first exposure amount is smaller than the number n of repetitions of imaging at the second exposure amount. That is, the number of the frames for the raindrop detection image area is smaller than the number of the frames for the around-vehicle information detection image. For example, when n=30 and m=1, it is desirable to switch between frames to be captured in the following rule: the frame of the around-vehicle information detection image area×30→the frame of the raindrop detection image area×1→the frame of the around-vehicle information detection image area×30→the frame of the raindrop detection image area×1→the frame of the around-vehicle information detection image area×30→ . . . .

Alternatively, when the initial values of n and m are set such that n=120 and m=1, and if a raindrop is detected at Step S126, the frequency of imaging the frame of the raindrop detection image area may be increased such that n=30 and m=1.

As described above, in the image processing method shown in the flowchart in FIG. 10, a rule for reading the pixel data of the frame of the raindrop detection image area differs from a rule for reading the frame of the around-vehicle information detection image area. Specifically, a rule for reading pixel data from only the around-vehicle information detection image area is applied to the frame of the around-vehicle information detection image area, and a rule for reading pixel data from only the raindrop detection image area is applied to the frame of the raindrop detection image area.

Figure 11:
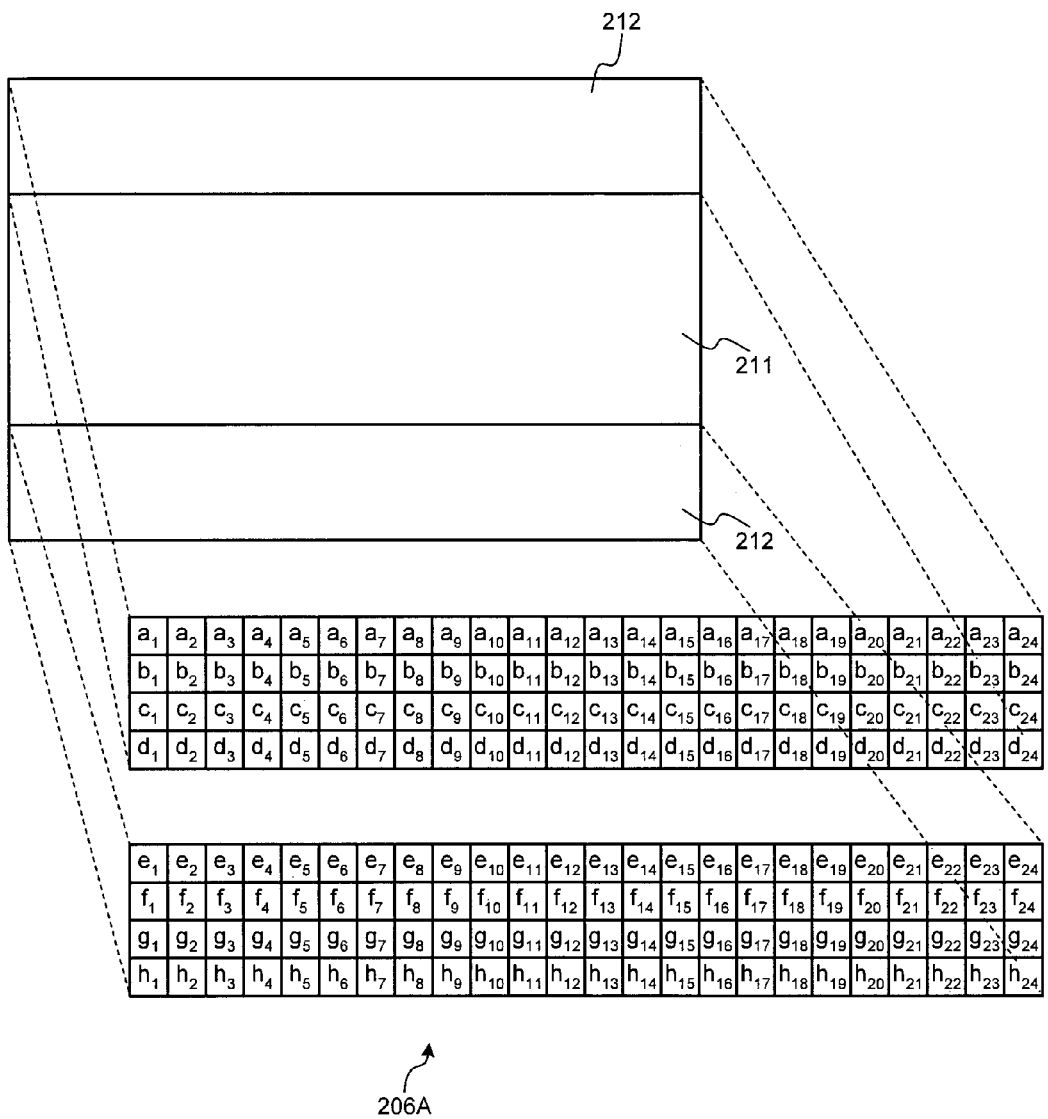
FIG. 11 is a diagram for explaining an example of a correspondence between divided areas in the optical filter and pixels of a photodiode.

A process for reading pixel data of the frame of the raindrop detection image area at Step S125 will be explained in detail below. FIG. 11 is a diagram for explaining an example of pixel arrangement with regard to the photodiodes 206A arranged in the infrared light transmission areas 212 corresponding to the raindrop detection image area of the frame of the raindrop detection image area. In FIG. 11, each pixel of the photodiodes 206A is simplified; however, in actuality, the photodiodes 206A correspond to hundreds of thousands of pixels arranged two-dimensionally.

In the configuration of the embodiment, because the imaging lens 204 (see FIG. 3) is not focused on the position of the windshield 105, an image of a raindrop obtained from the raindrop detection image area is originally out of focus and it is not necessary to ensure the high resolution in the raindrop detection image area. Therefore, at Step S125, it is not desirable to read all pixel data corresponding to the raindrop detection image area, but desirable to read pixel data corresponding to the raindrop detection image area by thinning out pixels.

Figures 12A, 12B, 12C, 12D:
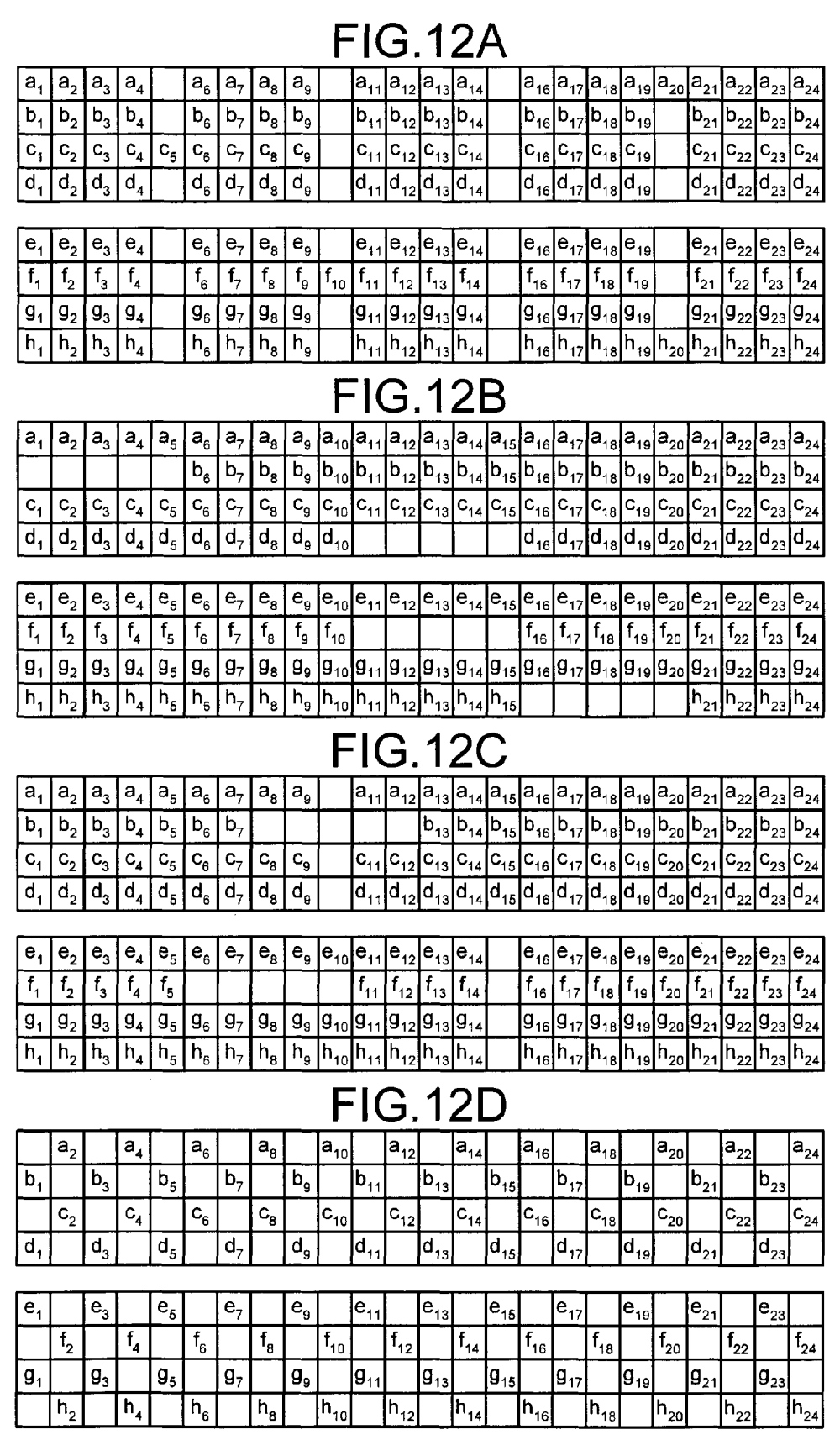

FIGS. 12A to D illustrate examples how pixels are thinned out. For example, as illustrated in FIG. 12A, it may be possible to skip reading a part or the whole of pixel data in a specific column. White squares in the drawing illustrate skipped pixels. Alternatively, it may be possible to skip reading a part or the whole of pixel data in a specific row (FIG. 12B), or it may be possible to skip reading a part or the whole of pixel data in specific row and column (FIG. 12C). Alternatively, as illustrated in FIG. 12D, it may be possible to skip reading pixel data in a checker manner.

Therefore, compared with a case that all pixel data corresponding to the raindrop detection image area is read, it becomes possible to shorten time to read the frame of the raindrop detection image area. In particular, it is desirable to read only pixel data corresponding to the raindrop detection image area from the frame of the raindrop detection image area and to thin out pixels as described above. In this case, it becomes possible to further increase the frame rate of the frame of the around-vehicle information detection image area.

For example, when the imaging element has the WXGA resolution (with 1280×800 pixel dots), and if pixels are thinned out to 640×640 dots for reading, it becomes possible to shorten the time needed to read by ¼.

Furthermore, to increase the frame rate of the frame of the around-vehicle information detection image area, it is desirable to decrease the areas of the infrared light transmission areas 212 (see FIG. 6) corresponding to the raindrop detection image area. Therefore, it is desirable to set the areas of the infrared light transmission areas 212 to be smaller than the area of the visible light transmission area 211 corresponding to the around-vehicle information detection image area.

Each of the units of the optical filter 205 will be explained in detail below. The substrate 220 is made of a transparent material that can transmit light in a bandwidth to be used (in the embodiment, a visible light region and an infrared region), such as glass, sapphire, or crystal. In the embodiment, glass, in particular, quartz glass (refractive index of 1.46) or Tempax glass (refractive index of 1.51), which are cheap and durable, can preferably be used.

Figure 13:
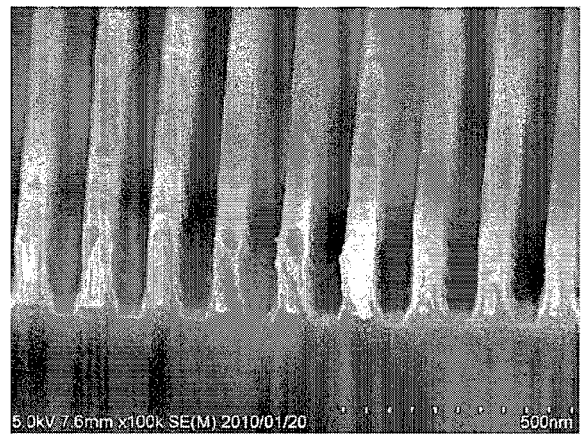
FIG. 13 is an enlarged view of a wire grid structure of a polarization filter layer.

The polarization filter layer 223 formed on the substrate 220 includes a polarizer formed with a wire grid structure as illustrated in FIG. 13. The wire grid structure is a structure in which a metal wire (conductive wire) that is made with metal, such as aluminum, and that extends in a specific direction is arranged at a predetermined pitch. By setting a wire pitch of the wire grid structure to be sufficiently smaller (for example, ½ or smaller) than the wavelength band of emission light (for example, 400 nm to 800 nm), it becomes possible to reflect most of light of an electric field vector component that oscillates in the direction parallel to the longitudinal direction of the metal wire and it becomes possible to transmit most of light of an electric field vector component that oscillates in the direction orthogonal to the longitudinal direction of the metal wire. Therefore, the polarizer can be used as a polarizer that generates single polarization.

In the polarizer with the wire grid structure, in general, when the cross-sectional area of the metal wire increases, the extinction ratio increases and the transmittance of the metal wire of a predetermined with or greater with respect to a cyclic width is reduced. If the cross section of the metal wire orthogonal to the longitudinal direction of the metal wire has a tapered shape, the transmittance and the wavelength dispersibility of polarization degree are low in a wide bandwidth, and the property of high extinction ratio is obtained.

Figure 14:
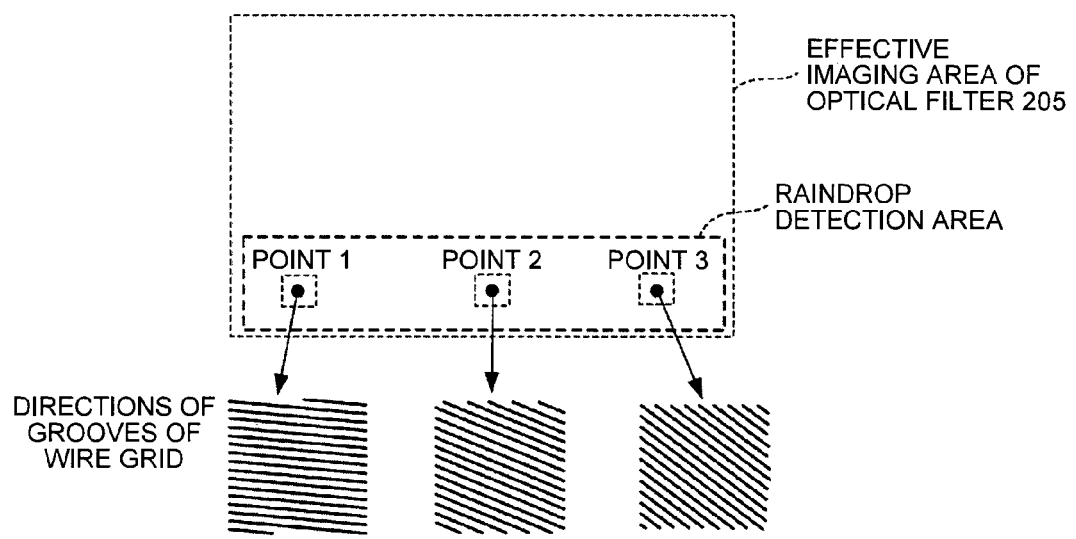
FIG. 14 is a diagram illustrating the longitudinal direction of a metal wire with the wire grid structure of the polarization filter layer.

FIG. 14 is a diagram for explaining the longitudinal direction of the metal wire with the wire grid structure in the polarization filter layer 223 of the optical filter 205. The windshield 105 is generally curved, so that the polarization direction of light reflected from the dashboard changes at various positions in the effective imaging area. Therefore, it is desirable to provide the polarization filter layer 223 with a polarization axis that corresponds to a change in the polarization direction.

Specifically, as illustrated in FIG. 14, to realize the polarization axis corresponding to the curve of the windshield 105, the longitudinal direction (a direction of grooves) of the wire grid structure is changed at various positions in the polarization filter layer 223.

In the embodiment, by forming the polarization filter layer 223 with the wire grid structure, it is possible to achieve the advantageous effects as described below.

The wire grid structure can be formed by a well-known semiconductor manufacturing process. Specifically, an aluminum thin film is deposited on the substrate 220, and thereafter, patterning is performed, and a sub wavelength concave-convex structure of the wire grid is formed by metal etching method or the like. In the manufacturing process, it is possible to adjust the longitudinal direction, that is, the polarization direction (the polarization axis), of the metal wire at the size equivalent to the size of an imaging pixel of the imaging element 206 (at a few μm level). Therefore, as in the embodiment, it becomes possible to generate the polarization filter layer 223 in which the longitudinal direction, that is, the polarization direction (the polarization axis), of the metal wire is changed in units of imaging pixels.

Besides, because the wire grid structure is made of a metal material such as aluminum, there are advantages in that the structure has high thermal resistance and is preferably usable in a high-temperature environment, such as the inside of a vehicle where the temperature is likely to increase.

The filler 224 used to flatten the top surface of the polarization filter layer 223 in the lamination direction is provided in a recess between the metal wires of the polarization filter layer 223. As the filler 224, an inorganic material with the same or smaller refractive index than that of the substrate 220 can preferably be used. The filler 224 in the embodiment is formed so as to cover also the top surface of the metal wire portion of the polarization filter layer 223 in the lamination direction.

As a specific material of the filler 224, it is preferable to use a low-refractive index material with a refractive index approximately close to the refractive index of air (refractive index=1) so as not to reduce the polarization characteristics of the polarization filter layer 223. For example, it is preferable to use a porous ceramics material made with ceramics in which fine air holes are dispersed. Examples of the porous ceramics material include porous silica ($SiO_2$), porous magnesium fluoride (MgF), and porous alumina ($Al_2O_3$). The degree of low refractive index is determined based on the number or the size of the air holes in the ceramics (the porosity). If a main component of the substrate 220 is made of silica crystal or glass, porous silica (n=1.22 to 1.26) can preferably be used.

As a method for forming the filler 224, an inorganic film coating method (spin on glass: SOC) can preferably be used. Specifically, a solvent formed by dissolving silanol (Si(OH)$_4$) in alcohol is spin-coated on the polarization filter layer 223 formed on the substrate 220, and then thermal treatment is performed to volatilize the solvent component and cause dehydration polymerization reaction of the silanol.

The polarization filter layer 223 has the wire grid structure with a sub wavelength size, so that the mechanical strength is low and the metal wire is damaged by small external force. It is desirable to closely arrange the optical filter 205 of the embodiment on the imaging element 206; therefore, the optical filter 205 and the imaging element 206 may come into contact with each other in the manufacturing stage. In the embodiment, because the top surface of the polarization filter layer 223 in the lamination direction, that is, the surface on the imaging element 206 side is covered with the filler 224, it is possible to prevent a damage on the wire grid structure due to the contact with the imaging element 206.

Besides, as in the embodiment, by filling the recess between the metal wires in the wire grid structure of the polarization filter layer 223 with the filler 224, it becomes possible to prevent a foreign matter from entering the recess.

In the embodiment, a protection layer, such as the filler 224, is not provided on the spectral filter layer 222 laminated on the filler 224. This is because, according to the experiments by the applicant, even when the spectral filter layer 222 comes in contact with the imaging element 206, no damage occurred that affects a captured image. Therefore, a protection layer is omitted to put priority on cost reduction. Besides, the height of the metal wire (protrusion) of the polarization filter layer 223 is generally small, that is, equal to or smaller than a half of the wavelength to be used, but the height of the spectral filter layer 222 is set to be equal to or several times greater than the wavelength to be used because the transmittance characteristics at the cutoff wavelength can be made steeper by increasing the height (thickness). As the thickness of the filler 224 increases, it becomes more difficult to ensure the flatness of the top surface of the filler and the characteristics of the optical filter 205 is more affected. Therefore, the degree of an increase in the thickness of the filler 224 is limited. Therefore, in the embodiment, the spectral filter layer 222 is not covered with filler. That is, in the embodiment, because the spectral filter layer 222 is formed after the polarization filter layer 223 is covered with the filler 224, it is possible to stably form a layer of the filler 224. Besides, it is possible to form the optimal characteristics of the spectral filter layer 222 formed on the top surface of the layer of the filler 224.

The spectral filter layer 221 and the spectral filter layer 222 of the embodiment are manufactured in a multilayer structure, in which a thin film with a high refractive index and a thin film with a low refractive index are alternately laminated multiple times. By employing the multilayer structure, the flexibility of setting the specular transmittance can be enhanced with use of light interference, and the reflectance of nearly 100% can be realized with respect to a predetermined wavelength (for example, the wavelength band other than red).

In the embodiment, because the wavelength range to be used for capturing image data is a wavelength band ranging from near-visible right to infrared light, the imaging element 206 having the sensitivity to the wavelength range to be used is employed. It is sufficient that the spectral filter layer 222 can transmit infrared light; therefore, it is sufficient to form a cut filter that has a transmission wavelength range of, for example, 940 nm or longer at the multilayer portion and that reflects the other wavelength bands (see FIG. 9B).

The cut filter can be obtained by forming a multilayer with a structure of "substrate/(0.125L 0.25H 0.125L)p/medium A" from the lower side of the optical filter 205 in the lamination direction. The "substrate" is the filler 224 described above. The "0.125L" is based on the description of the film thickness of a low refractive index material (for example, $SiO_2$) where nd/λ is 1L. Specifically, a film with "0.125L" is a film made of a low refractive index material with a film thickness for the light path length of ⅛ wavelength. Here, "n" is a refractive index, "d" is a thickness, and "λ" is a cutoff wavelength. Similarly, "0.25H" is based on the description of the film thickness of a high refractive index material (for example, $TiO_2$) where nd/λ is 1H. Specifically, a film with "0.25H" is a film made of a high refractive index material with a film thickness for the light path length of ¼ wavelength. Here, "p" means the number of repetitions (laminations) of a combination of films described in the parentheses. The influence of ripple or the like can be more reduced by increasing "p". The medium A means resin or adhesive agent for a close adhesion to air or the imaging element 206.

As illustrated in FIG. 8B described above, the spectral filter layer 222 may be a bandpass filter with a transmission wavelength range of 940 nm to 970 nm. With such a bandpass filter, it becomes possible to distinguish a near infrared region on the wavelength band longer than a red region from the red region. Such a bandpass filter can be obtained by forming a multilayer with a structure of, for example, "substrate/(0.125L 0.5M 0.125L)p(0.125L 0.5H 0.125L)q(0.125L 0.5H 0.125L)r/medium A". As described above, if titanium dioxide ($TiO_2$) is used as a high refractive index material and silicon dioxide ($SiO_2$) is used as a low refractive index material, it becomes possible to realize the spectral filter layer 222 with high weathering resistance.

An example of a method for manufacturing the spectral filter layer 222 of the embodiment is explained below. First, a multilayer film as described above is formed on the layer of the filler 224 formed on the substrate 220 and the polarization filter layer 223. As a method for forming the multilayer film as above, a well-known evaporation method or the like may be used. Subsequently, a multilayer film is removed at a portion corresponding to a non-specular region. As a method for the removal, a general lift-off processing method may be used. In the lift-off processing method, an inverse pattern of a desired pattern is formed on the top of the layer of the filler 224 in advance by metal or photoresist, a multilayer is formed on the processed top surface, and the multilayer film at the portion corresponding to the non-specular region is removed together with metal or photoresist.

In the embodiment, because a multilayer structure is employed in the spectral filter layer 222, there is an advantage in that the flexibility of setting the spectral characteristics is high. In general, a color filter used in a color sensor or the like is formed with resist agent. However, it is more difficult to control the spectral characteristics by the resist agent compared with a multilayer structure. In the embodiment, because the multilayer structure is employed in the spectral filter layer 221 and the spectral filter layer 222, it is possible to match the wavelength of the light source 202 and the wavelength range of the infrared light transmission area 212.

Figure 15:
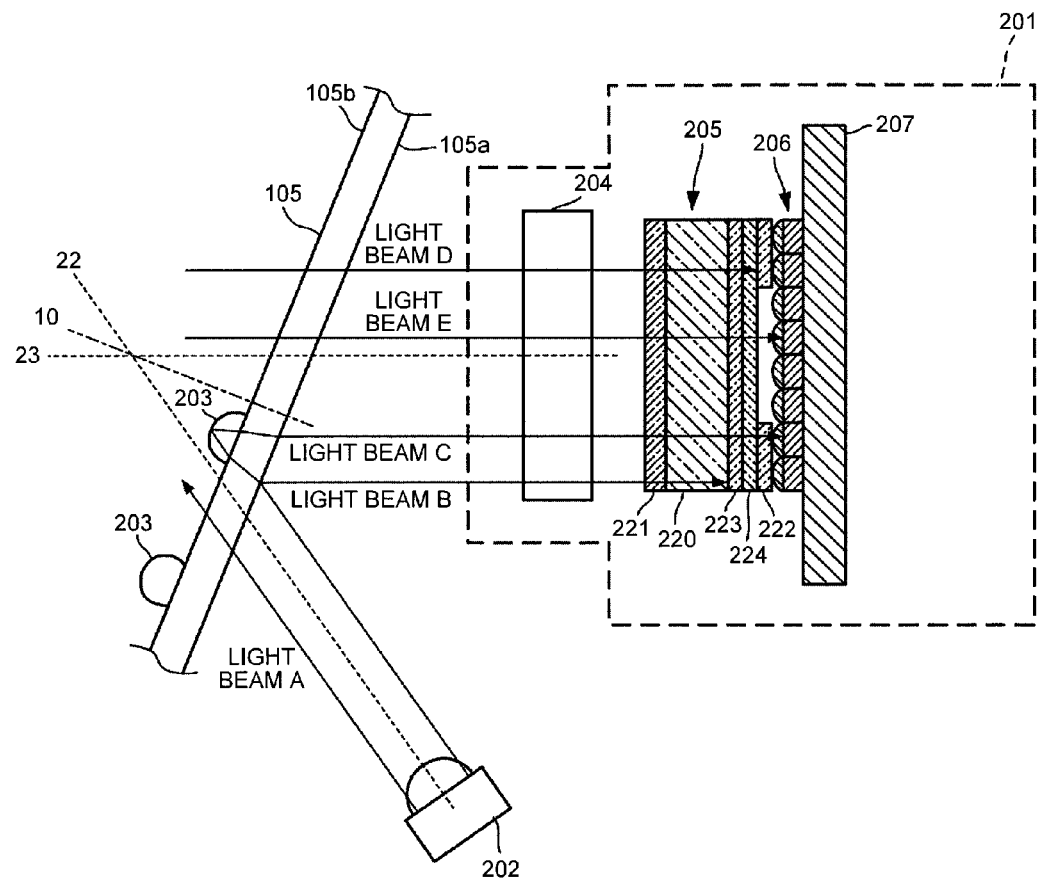
FIG. 15 is a diagram for explaining light paths of light emitted from a light source of the imaging device.

FIG. 15 is a diagram for explaining a light path of light emitted by the light source 202 of the imaging device 201. The incidence angle of the light emitted from the light source 202 to the windshield 105 is set so that light emitted from the light source 202 and reflected at the interface between the raindrop and air is imaged on the imaging element 206. According to the experimental results obtained by the embodiment, examples of a layout in which the intensity of reflection light from the raindrop becomes maximum include a layout in which the light source 202 is arranged such that the optical axes of the imaging lens 204 and the light source 202 become approximately parallel to each other; and a layout in which the optical axis 23 of the imaging lens 204 and the optical axis 22 of the light source 202 are arranged so as to sandwich a normal line 10 of the outer surface 105b of the windshield 105 passing the optical axis 23 of the imaging lens 204 and the optical axis 22 of the light source 202.

FIG. 15 illustrates the latter of the above two layouts. Hereinafter, with reference to FIG. 15, an explanation is given of the functions of the image processing system 110 of the embodiment to detect a foreign matter, such as a raindrop, attached to the outer surface 105b of the windshield 105.

Light Beam A

A part of light from a light beam A traveling to a portion where a raindrop is not attached on the outer surface 105b of the windshield 105 is output to the outside of the vehicle 100. A part of the rest of the light is reflected from the inner surface 105a of the windshield 105 (not illustrated).

Light Beam B

As described above, a part of the light emitted by the light source 202 is reflected from the inner surface 105a of the windshield 105. As described above, most of the polarization component of such a reflection light is an S-polarized component. Besides, such a reflection light is not needed to detect a raindrop and may cause false detection. In the embodiment, because the polarization filter layer 223 for cutting the S-polarized component is arranged on the optical filter 205, it is possible to eliminate unnecessary light.

Light Beam C

As components of light emitted by the light source 202 and transmitted through the windshield 105 without being reflected from the inner surface 105a of the windshield 105, the amount of a P-polarized component becomes greater than the amount of the S-polarized component. The light incident on the windshield 105 is multiple-reflected inside a raindrop when the raindrop is attached to the outer surface 105b of the windshield 105, re-transmits through the windshield 105 toward the imaging device 201, and reaches the optical filter 205 of the imaging device 201.

The light that has reached the optical filter 205 transmits through the spectral filter layer 221, and the P-polarized component transmits through the polarization filter layer 223 in the wire grid structure. Of the light of the P-polarized component (infrared light) that has transmitted through the polarization filter layer 223, light that reaches the spectral filter layer 222 of the infrared light transmission area 212 for raindrop detection transmits through the spectral filter layer 222 and enters the imaging element 206, so that the image analyzing unit 102 illustrated in FIG. 1 or the like can recognize that the raindrop is attached to the outer surface 105b of the windshield 105. The light of the P-polarized component that has transmitted through the polarization filter layer 223 may also enter the visible light transmission area 211. However, if a filter for cutting infrared-wavelength light applied by the light source 202 is formed in this area, it becomes possible to prevent the light from entering the imaging element 206.

Light Beam D

Of the light that comes from the outer surface 105b side of the windshield 105 and reaches the imaging device 201 rather than the light from the light source 202, most of the light that reaches the infrared light transmission area 212 is cut by the spectral filter layer 221 and the spectral filter layer 222. In this way, the infrared light transmission area 212 is structured so as to cut ambient light from the outside of the windshield 105.

Light Beam E

Of the light that comes from the outer surface 105b side of the windshield 105 and transmits through the visible light transmission area 211 rather than the light from the light source 202, only a visible light component and a component in a wavelength band of the infrared-wavelength light applied by the light source 202 transmit through the spectral filter layer 221 as P-polarized components, reach the imaging element 206 while unnecessary light is cut, and are detected as a signal for detecting around-vehicle information.

Figure 16A:
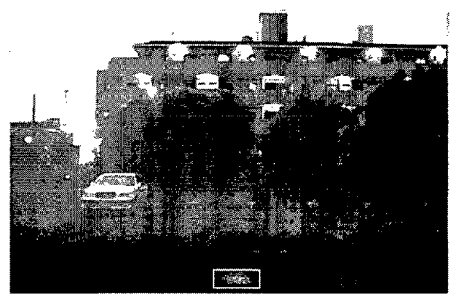
FIGS. 16A and B are diagrams for explaining images as experimental results obtained by the embodiment.
Figure 16B:
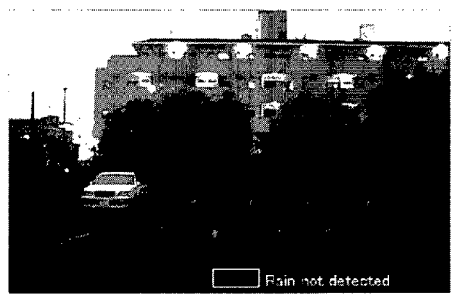

FIGS. 16A and B are diagrams for explaining images as experimental results obtained by the embodiment. The raindrop detection image areas are arranged on the upper and lower portions of the image. FIG. 16A illustrates an image obtained when a raindrop is attached to the windshield 105; and FIG. 16B illustrates an image obtained when a raindrop is not attached to the windshield 105.

Portions enclosed by white rectangles in FIGS. 16A and B correspond to the raindrop detection image areas; and when a raindrop is attached in the region, LED light from the light source 202 enters the imaging element 206, and the image analyzing unit 102 recognizes that the raindrop is attached to the outer surface 105b of the windshield 105. In this case, it is preferable to display "Rain detected!" or the like in an image to notify a driver that a raindrop is attached.

On the other hand, when a raindrop is not attached to the outer surface 105b of the windshield 105, because LED light from the light source 202 does not enter the imaging element 206, the image analyzing unit 102 does not recognize attachment of a raindrop. In this case, it is preferable to display "Rain not detected" or the like in an image for notifying the driver that a raindrop is not attached.

The above recognition process by the image analyzing unit 102 is preferably performed in the following manner for example. The image analyzing unit 102 recognizes that a raindrop is attached when the amount of received light exceeds a threshold and recognizes that a raindrop is not attached when the amount of received light is equal to or smaller than the threshold based on the threshold set in advance with respect to the amount of LED light received by the imaging element 206.

The above threshold is not necessarily a predetermined constant value, but may be calculated one by one based on exposure adjustment information on the around-vehicle information detection image. For example, it may be possible to increase the light output power of the light source 202 and the threshold when the illuminance is high during daytime in which the neighborhood of the vehicle is bright. Consequently, it becomes possible to detect a raindrop while eliminating the influence of the ambient light.

As described above, according to the image processing system of the embodiment, a vehicle including the image processing system, and the image processing method, in a system in which one imaging device detects a foreign matter (mainly a raindrop) and detects around-vehicle information, it is possible to switch between sequential imaging of frames for around-vehicle information detection and sequential imaging of frames for foreign-matter detection and to analyze the images. Therefore, it is possible to reduce power consumption and to enhance the safety.

Furthermore, according to the image processing system of the embodiment, a vehicle including the image processing system, and the image processing method, it is possible to prevent a reduction in the frames for around-vehicle information detection due to insertion of frames for foreign-matter detection by differentiating a rule for reading pixel data of the frames for foreign-matter detection from a rule for reading the frames for around-vehicle information detection.

The image analyzing unit 102 (see FIG. 1) includes a CPU (not illustrated) and a memory (not illustrated). By installing a program in the memory, the image analyzing unit 102 is configured as software. In this case, the program itself realizes the functions of the embodiment described above. In this case, the constituent elements of the present invention include the program; a means for supplying the program to the computer, such as a recording medium storing the program; and a transmission medium, such as the Internet, for transmitting the program. As the recording medium, a CD-ROM, a flexible disk (FD), a CD-R, a digital versatile disk (DVD), or the like may be used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing system, comprising:
a light source configured to emit light from one surface side of a transparent member to the transparent member;
a camera including an imaging sensor that captures light emitted by the light source and reflected from foreign matter attached to an other surface side of the transparent member, and captures light transmitted through the transparent member from the other surface side; and
processing circuitry configured to read and analyze captured image data captured by the camera,
wherein the captured image data includes a first image area frame for detecting the foreign matter, and a second image area frame for acquiring information beyond the transparent member,
the imaging sensor includes a first area that captures light emitted by the light source and reflected from the foreign matter attached to the other surface side of the transparent member, and that captures light transmitted through the transparent member from the other surface side, and a second area that captures light transmitted through the transparent member from the other surface side,
the processing circuitry is configured to apply different rules when reading pixel data of the first image area frame as compared to when reading the second image area frame, and
the camera is configured to capture the first image area frame at a first exposure amount and capture the second image area frame at a second exposure amount.

2. The image processing system according to claim 1, wherein the processing circuitry is further configured to read the pixel data of the first image area frame from only the first image area.

3. The image processing system according to claim 1, wherein the processing circuitry is further configured to thin out pixels when reading the first image area frame.

4. The image processing system according to claim 1, wherein the processing circuitry is further configured to read pixel data of the second image area frame from only the second image area.

5. The image processing system according to claim 1, wherein an area of a predetermined area is smaller than an area of an effective imaging area excluding the predetermined area.

6. The image processing system according to claim 1, further comprising an optical filter provided between the transparent member and the imaging sensor, the optical filter transmitting only light in a predetermined wavelength range in a predetermined area of an effective imaging area.

7. The image processing system according to claim 6, wherein the optical filter includes:
a substrate that is transparent with respect to light in a bandwidth to be used;
a first spectral filter layer formed on an entire surface of the effective imaging area on the substrate on a transparent member side, the first spectral filter layer transmitting only light of a wavelength component in ranges from wavelength $\lambda 1$ to $\lambda 2$ and wavelengths $\lambda 3$ to $\lambda 4$ ($\lambda 1 < \lambda 2 < \lambda 3 < \lambda 4$); and
a second spectral filter layer formed on the predetermined area of the effective imaging area on the substrate on an imaging sensor side, the second spectral filter layer transmitting only light of a wavelength component in the range from the wavelengths $\lambda 3$ to $\lambda 4$, wherein an emission wavelength of the light source is within the range from the wavelengths $\lambda 3$ to $\lambda 4$.

8. A vehicle, comprising:
an image processing system;
a windshield wiper that removes foreign matter attached to a windshield of the vehicle; and
a windshield wiper control circuit that receives a detection result of the foreign matter from processing circuitry of the image processing system and generates a control signal for controlling the windshield wiper, wherein the image processing system includes:
a light source configured to emit light from one surface side of the windshield to the windshield;
a camera including an imaging sensor that captures light emitted by the light source and reflected from the foreign matter attached to an other surface side of the windshield, and captures light transmitted through the windshield from the other surface side; and
the processing circuitry configured to read and analyze captured image data captured by the camera,
wherein the captured image data includes a first image area frame for detecting the foreign matter, and a second image area frame for acquiring information beyond the windshield,
the imaging sensor includes a first area that captures light emitted by the light source and reflected from the foreign matter attached to the other surface side of the windshield, and that captures light transmitted through the windshield from the other surface side, and a second area that captures light transmitted through the windshield from the other surface side,
the processing circuitry applies different rules when reading pixel data of the first image area frame as compared to when reading the second image area frame, and
the camera is configured to capture the first image area frame at a first exposure amount and capture the second image area frame at a second exposure amount.

9. The vehicle according to claim 8, wherein the image processing system further includes an optical filter provided between the windshield and the imaging sensor, the optical filter transmitting only light in a predetermined wavelength range in a predetermined area of an effective imaging area.

10. An image processing method implemented by an image processing system that includes a light source configured to emit light from one surface side of a transparent member to the transparent member, the image processing method comprising:
performing imaging by
capturing, by an imaging sensor, light emitted by the light source and reflected from foreign matter attached to an other surface side of the transparent member, and
capturing, by the imaging sensor, light transmitted through the transparent member from the other surface side; and
image-analyzing that includes analyzing captured image data captured in the imaging step,
wherein the captured image data includes a first image area frame for detecting the foreign matter, and a second image area frame for acquiring information beyond the transparent member,
the imaging sensor includes a first area that captures light emitted by the light source and reflected from the foreign matter attached to the other surface side of the transparent member, and that captures light transmitted through the transparent member from the other surface side, and a second area that captures light transmitted through the transparent member from the other surface side,
the image-analyzing step further includes applying different rules when reading pixel data of the first image area frame as compared to when reading the second image area frame, and
the imaging step includes capturing the first image area frame at a first exposure amount and capturing the second image area frame at a second exposure amount.

11. The image processing method according to claim 10, further comprising:
transmitting, by an optical filter provided in the image processing system, only light in a predetermined wavelength range in a predetermined area of an effective imaging area.

12. A computer program product comprising a non-transitory computer usable medium having computer-readable program codes embodied in the medium for an image processing system, when the program codes executed, to execute the image processing method according to claim 10.

13. A computer program product comprising a non-transitory computer usable medium having computer-readable program codes embodied in the medium for an image processing system, when the program codes executed, to execute the image processing method according to claim 11.

14. The image processing system according to claim 1, wherein the processing circuitry is further configured to make a resolution of the first image area frame smaller than a resolution of the second image area frame so as to shorten a time to read the first image area frame compared to a time to read the second image area frame.

15. The image processing system according to claim 1, wherein the processing circuitry is further configured to make data amount of the first image area frame smaller than data amount of the second image area frame so as to shorten a time to read the first image area frame compared to a time to read the second image area frame.

\* \* \* \* \*